United States Patent
Mineda et al.

(10) Patent No.: US 9,020,496 B2
(45) Date of Patent: Apr. 28, 2015

(54) SYSTEM FOR TESTING MOBILE COMMUNICATION APPARATUS AND TEST METHOD THEREFOR

(75) Inventors: Keiichi Mineda, Atsugi (JP); Yoshitaka Kihara, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 254 days.

(21) Appl. No.: 13/611,874

(22) Filed: Sep. 12, 2012

(65) Prior Publication Data
US 2013/0084853 A1 Apr. 4, 2013

(30) Foreign Application Priority Data
Sep. 30, 2011 (JP) .................................. 2011-216177

(51) Int. Cl.
*H04W 24/00* (2009.01)
*H04W 24/06* (2009.01)

(52) U.S. Cl.
CPC ..................................... *H04W 24/06* (2013.01)

(58) Field of Classification Search
USPC ................................................. 455/423, 425
See application file for complete search history.

(56) References Cited

U.S. PATENT DOCUMENTS

| | | | |
|---|---|---|---|
| 6,615,040 B1* | 9/2003 | Benveniste | 455/423 |
| 6,819,924 B1* | 11/2004 | Ma et al. | 455/425 |
| 7,085,592 B1* | 8/2006 | Davies | 455/562.1 |
| 7,689,213 B2* | 3/2010 | Olgaard et al. | 455/425 |
| 2004/0198340 A1* | 10/2004 | Lee et al. | 455/423 |
| 2007/0243825 A1 | 10/2007 | Olgaard et al. | |
| 2009/0124252 A1* | 5/2009 | Jin et al. | 455/425 |

FOREIGN PATENT DOCUMENTS

| | | |
|---|---|---|
| CN | 1571270 A | 1/2005 |
| CN | 101455009 A | 6/2009 |
| JP | 2003-46431 | 2/2003 |
| JP | 3708458 | 8/2005 |

OTHER PUBLICATIONS

Chinese Office Action (search report only) mailed Sep. 28, 2014 (with English translation of search report).

* cited by examiner

*Primary Examiner* — Vladimir Magloire
*Assistant Examiner* — Shantell L Heiber
(74) *Attorney, Agent, or Firm* — Greer Burns & Crain Ltd.

(57) ABSTRACT

In a system for testing a mobile communication device under test, a calculation part calculates, before a control part starts processing according to a designated measurement sequence, a total value of a data amount to be acquired as an analysis target by a transmission/reception unit in the designated measurement sequence. A determination part determines whether the calculated total value of the data amount exceeds a permissible value which has been set in advance according to a predetermined capacity of a reception data memory. If the determination part determines that the calculated total value exceeds the permissible value, the control part displays the determination result on the display unit.

12 Claims, 4 Drawing Sheets

| Mode | Capture sampling rate | Smallest measurement unit (one step length) | Number of samples per step |
|---|---|---|---|
| Tx power | 50MS/S | 1 ms | 50000 |
| WCDMA | 50MS/S | 1 slot | 33333 |
| GSM | 10MS/S | 1 frame | 46153 |
| cdma2001 1x | 20MS/S | 1 slot | 25000 |
| cdma2001 1x EV-DO | 20MS/S | 1 slot | 33333 |
| LTE | 50MS/S | 1 slot | 25000(1 slot) 50000(1 subframe) |

FIG. 3

| Mode | Longest capture length | Total number of samples |
|---|---|---|
| Tx power | 10 ms | 500000 |
| WCDMA | 7000 slots | 233331000 |
| GSM | 5000 frames | 230765000 |
| cdma2001 1x | 10000 slots | 250000000 |
| cdma2001 1x EV-DO | 7000 slots | 233331000 |
| LTE | 10000 slots | 250000000 |

SYSTEM FOR TESTING MOBILE COMMUNICATION APPARATUS AND TEST METHOD THEREFOR

CROSS-REFERENCE TO RELATED APPLICATIONS

This application is based upon and claims the benefit of priority from prior Japanese Patent Application No. 2011-216177, filed Sep. 30, 2011, the entire contents of which are incorporated herein by reference.

BACKGROUND OF THE INVENTION

1. Field of the Invention

The present invention relates to a system for testing a mobile communication apparatus, and a test method therefor and, more particularly, a technique in which in a test system having a sequence measurement function of efficiently performing, according to a measurement sequence created in advance, a test for a mobile communication apparatus including a base station and a mobile terminal such as a mobile phone, or a communication circuit component used for the base station or mobile terminal such as an integrated circuit or a circuit board including it, it is checked whether a series of sequences arbitrarily created is executable, thereby enabling to avoid an inexecutable measurement.

2. Description of the Related Art

Various tests for a mobile terminal represented by a mobile phone and a communication circuit component used for it are conventionally performed by establishing a wireless call connection with a device under test using a pseudo base station apparatus which operates in the same manner as a base station apparatus in a mobile communication network. As an example, Japanese Patent No. 3708458 (which corresponds to KOKAI Publication No. 2003-046431) discloses such a test method. This test method, however, requires a long time to establish a call connection and to perform a control operation, thereby reducing the test efficiency.

To solve this problem, a test system which uses both sequence measurement and measurement using a wired connection control method has been devised. In the measurement using the wired connection control method in the test system, a device under test is directly connected with a cable to be set to a test mode, and is given a command necessary for a test, thereby measuring a signal which is output from the device under test in response to the command. On the other hand, in the sequence measurement in the test system, a measurement sequence as list information including a plurality of measurement items to be executed for a device under test is prepared, transmission/reception tests are sequentially performed for the device under test according to the measurement sequence, and data obtained in a transmission/reception test which corresponds to each measurement item is stored in a memory. When data corresponding to the plurality of measurement items are acquired, the acquired data are read out from the memory, and each item undergoes processing such as analysis processing.

Such a test system can directly control a device under test according to a series of measurement sequences which was created by the user in advance, and automatically acquire data necessary for analysis, thereby allowing a test much more efficient than the conventional method of establishing a wireless call connection and controlling a terminal. Note that a mobile terminal and a circuit component used for it, especially a communication circuit has, in advance, a test mode which supports the test using the wired connection control method.

There are a number of measurement items necessary for delivery inspection which is performed in a production line or the like for a mobile terminal or the like. For example, basic transmission measurement items for a 3GPP W-CDMA terminal include the transmission power of the terminal, a frequency error, an occupied bandwidth, a spectrum emission mask, adjacent channel leakage power, and modulation analysis. In a test for a mobile terminal or the like, a wireless signal transmitted from the terminal is received to obtain data necessary for analyzing each of the transmission measurement items, and the data is read out to analyze each item.

On the other hand, reception measurement items include, for example, bit error measurement for a reception sensitivity test. In the bit error measurement, for example, a terminal is set to a loopback test mode according to the 3GPP standard, and a test system transmits a wireless frequency signal modulated with known data to the terminal. Then, the terminal receives and demodulates the signal, and the test system receives and demodulates the signal which is returned from the terminal, and compares the obtained signal with the known data.

Basic transmission measurement items for a terminal complying with GSM/GPRS as the communication standard which has become widespread in the world include a transmission power, a transmission frequency, a phase error, power versus time (template/mask determination), and an output spectrum. For these measurement items, a signal which is transmitted at a wireless frequency by the terminal is received to obtain data necessary for analyzing each item, and the data is read out to analyze each item. For reception measurement, error measurement for demodulated data which is returned in the loopback mode is main measurement.

For the mobile terminal, there are communication standards such as CDMA2000 1x, CDMA2000 1xEVDO, and LTE in addition to the above standards, and measurement items are defined for each standard.

If measurement is performed using a sequence measurement function in terms of a number of measurement items for such a terminal, the test system executes transmission/reception processing with the terminal at once according to a measurement sequence created in advance, and stores data necessary for analysis in a memory to execute analysis processing. The amount of data acquired in the sequence measurement is mostly determined based on the frequency bandwidth of a transmission signal of the terminal, that is, a frequency bandwidth and an equalization processing count which are determined according to a communication standard. In general, the user can arbitrarily designate these parameters.

Furthermore, since there are different communication standards (W-CDMA, GSM/GPRS, CDMA2000, and the like) for a terminal as described above, and a multi-mode terminal which supports a plurality of different communication standards is recently implemented, it is necessary to perform, for the terminal, unique measurement for each communication standard. Therefore, to simultaneously perform tests for a multi-mode terminal using sequence measurement, the amount of data to be acquired naturally increases.

A list used in sequence measurement can be applied to a test system having a similar function in many cases, and has, therefore, general-purpose use such that the user arbitrarily edits a list used in another test system to use it.

On the other hand, a memory capacity for data storage of the test system is limited. If, therefore, the user sets many measurement items, or makes parameter settings which prolong the measurement time, the total amount of acquired data exceeds the memory capacity for data storage during execution of a series of transmission/reception processes according to a measurement sequence. This results in error measurement or unnecessary measurement for data which have been incorrectly acquired.

In particular, a system with a hardware configuration in which a personal computer creates a measurement sequence, registers it in the sequence memory of a main body by remote control, and then executes it is most likely to perform error measurement or unnecessary measurement due to the above factors.

BRIEF SUMMARY OF THE INVENTION

An object of the present invention is to provide a system for testing a mobile communication apparatus and a method of testing the mobile communication apparatus without error measurement or unnecessary measurement for testing the mobile communication apparatus.

More particularly, the objection of the present invention is to a system for testing a mobile communication apparatus and a method of testing the mobile communication apparatus, which has a sequence measurement function of efficiently performing a test for a mobile communication apparatus including a base station and a mobile terminal such as a mobile phone, or a communication circuit component used for the base station or mobile terminal, wherein the sequence measurement previously performs a checking whether a series of sequences is executable in respect to testing data obtained from the mobile communication apparatus and a checking result is informed to a testing user so as to avoid an error measurement or an unnecessary measurement for testing the mobile communication apparatus.

To achieve the above described object, according to a first aspect of the present invention, there is provided a system for testing a mobile communication device under test comprising:

a transmission/reception unit (21) configured to transmit a transmission signal to the device under test, and receive a target data signal from the device under test in response to the testing signal;

a reception data memory (23) having a predetermined capacity, and configured to store analysis target data which has been obtained from the target data signal when the transmission/reception unit receives the transmission signal of the device under test;

a transmission/reception control unit (25) configured to control transmission/reception for the transmission/reception unit and the reception data memory according to a designated parameter;

analysis means (26) for reading out data stored in the reception data memory to execute a designated analysis processing for the data;

sequence list storage means (30) for storing, as a measurement sequence, information containing a plurality of measurement operations to be sequentially executed for the device under test, and an execution order of the measurement operations;

execution sequence designation means (32) for designating a sequence, which a user wants to execute, of the measurement sequences stored in the sequence list storage means;

sequence measurement control means (35) for sequentially executing parameter setting processing for the device under test and the transmission/reception control unit according to the measurement sequence designated by the execution sequence designation means, and storing, in the reception data memory, data acquired by the transmission/reception unit from a start to an end of the measurement sequence; and a display unit (61);

the system further comprising:

data amount calculation means (40) configured to calculate, before the sequence measurement control means starts processing according to the designated measurement sequence, a total value of a data amount to be acquired as an analysis target by the transmission/reception unit in the designated measurement sequence; and data amount determination means (41) for determining whether the calculated total value of the data amount exceeds a permissible value which has been set in advance according to the predetermined capacity of the reception data memory;

wherein if the data amount determination means determines that the calculated total value of the data amount exceeds the permissible value, the sequence measurement control means displays the determination result on the display unit.

According to a second aspect of the present invention, there is provide the system according to the first aspect, wherein the device under test includes a mobile terminal, a base station, or a communication circuit component used for the mobile terminal or the base station.

According to a third aspect of the present invention, there is provide the system according to the first aspect, wherein the data amount calculation means obtains, for each of the plurality of measurement operations, a data amount for the measurement operation by calculating a product of a data amount per predetermined measurement unit and a measurement unit count required for the measurement operation, and calculates the total value by obtaining a sum of the data amounts.

According to a fourth aspect of the present invention, there is provide the system according to the third aspect, wherein the measurement unit is one frame or one slot according to a communication standard with which the device under test complies.

According to a fifth aspect of the present invention, there is provide the system according to the first aspect, wherein if it is determined that the total value of the data amount exceeds the permissible value, the data amount determination means checks an executable range of the measurement sequence designated to execute, within which a data amount from a start does not exceed the permissible value, and notifies the sequence measurement control means of the executable range, and the sequence measurement control means displays, on the display unit, the determination result including the executable range.

According to a sixth aspect of the present invention, there is provide the system according to the first aspect, wherein if it is determined that the total value of the data amount exceeds the permissible value, the data amount determination means divides the measurement sequence designated to execute into a plurality of executable blocks each of which has a data amount not exceeding the permissible value, and notifies the sequence measurement control means of information for specifying ranges of the respective blocks, and the sequence—measurement control means displays, on the display unit, the determination result including the information for specifying the ranges of the plurality of executable blocks.

According to a seventh aspect of the present invention, there is provide method of testing a mobile communication device under test, comprising steps of:

storing, as a measurement sequence, information containing a plurality of measurement operations to be sequentially executed for the device under test, and an execution order of the measurement operations, designating a sequence, which a user wants to execute, of the stored measurement sequences, sequentially executing parameter setting processing necessary for transmitting a transmission signal to the device under test and receiving a target data signal from the device under test according to the designated measurement sequence, and storing, in a reception data memory having a predetermined capacity, analysis target data received from a start to an end of the measurement sequence, and reading out data stored in the reception data memory and executing designated analysis processing, the method comprising the steps of:

calculating, before the designated measurement sequence is executed, a total value of a data amount to be acquired as an analysis target data in the designated measurement sequence;

determining whether the calculated total value of the data amount exceeds a permissible value which has been set in advance according to the predetermined capacity of the reception data memory; and displaying the determination result.

According to a eighth aspect of the present invention, there is provide the method according to the seventh aspect, wherein the device under test includes a mobile terminal, a base station, or a communication circuit component used for the mobile terminal or the base station.

According to a ninth aspect of the present invention, there is provide the method according to the seventh aspect, wherein the step of calculating the total value of the data amount comprises the steps of obtaining, for each of the plurality of measurement operations, a data amount for the measurement operation by calculating a product of a data amount per predetermined measurement unit and a measurement unit count required for the measurement operation, and calculating the total value by obtaining a sum of the data amounts.

According to a tenth aspect of the present invention, there is provide the method according to the ninth aspect, wherein the measurement unit is one frame or one slot according to a communication standard with which the device under test complies.

According to a eleventh aspect of the present invention, there is provide the method according to the seventh aspect, which further comprises the steps of checking, if it is determined that the total value of the data amount exceeds the permissible value, an executable range of the measurement sequence designated to execute, within which a data amount from a start does not exceed the permissible value, and displaying the determination result including the executable range.

According to a twelfth aspect of the present invention, there is provide the method according to the seventh aspect, which further comprises the steps of dividing, if it is determined that the total value of the data amount exceeds the permissible value, the measurement sequence designated to execute into a plurality of executable blocks each of which provides a data amount not exceeding the permissible value, and displaying the determination result including information for specifying ranges of the plurality of executable blocks. dr

DETAILED DESCRIPTION OF THE INVENTION

A mobile communication apparatus test system 20 according to an embodiment of the present invention will be described below with reference to the accompanying drawings.

Figure 1:
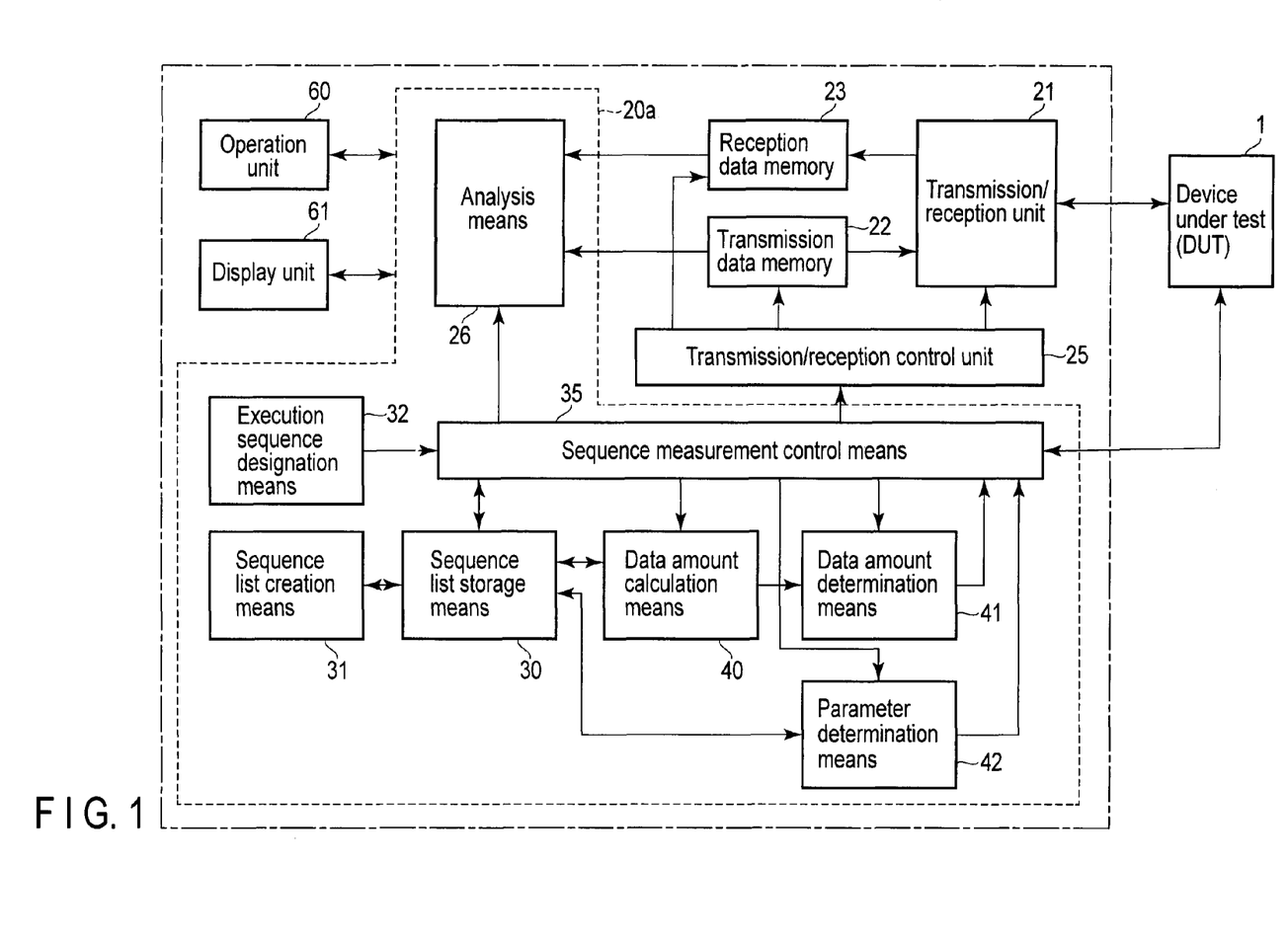
FIG. 1 is a block diagram showing the overall configuration of a mobile communication apparatus test system according an embodiment of the present invention.

FIG. 1 shows the overall configuration of the mobile communication apparatus test system 20 to which the present invention is applied.

The mobile communication apparatus test system 20 considers, as a device under test (DUT) 1, a base station or a mobile terminal such as various types of mobile phones, or a communication circuit component (an integrated circuit for communication, a board including it, or the like) used for the base station or mobile terminal. The mobile communication apparatus test system 20 includes a transmission/reception unit 21 which transmits/receives a wireless frequency signal to/from the device under test 1. That is, the transmission/reception unit 21 transmits a transmission signal, i.e., a baseband data signal, to the device under test, and receives a measurement signal, i.e., a target data signal from the device under test in response to the testing signal. The mobile communication apparatus test system 20 also includes a transmission data memory 22 which stores the transmission signal, i.e., the baseband data signal to be used to test the reception function of the device under test 1, and a reception data memory 23 with a predetermined capacity M, which stores, as analysis target data, the measurement signal, i.e., the target data signal that has been received by the transmission/reception unit 21 when testing the transmission function of the device under test 1. A case in which the device under test 1 is a mobile terminal will be described below.

When testing the reception function of the device under test 1, the transmission/reception unit 21 D/A converts I and Q baseband quadrature data read out from the transmission data memory 22, and performs quadrature modulation for a carrier signal, thereby generating and outputting a high-frequency digital modulated wave in which an amplitude and phase change according to the I and Q quadrature data. At this time, if the device under test 1 has been set to the loopback state mentioned earlier, the device under test 1 transmits a digital modulated wave which has been modulated with data demodulated by itself. The transmission/reception unit 21 receives the digital modulated wave, performs demodulation to obtain I and Q quadrature data, and provides them to an analysis means or part 26 (to be described later) to execute processing such as error measurement. Alternatively, if the device under test 1 is in a state in which it can output demodulated data and a clock via a cable, instead of the loopback state, it provides the demodulated data and the clock to the analysis means or part 26 via a sequence measurement control means or part 35 (to be described later) to execute processing such as error measurement. That is, when testing the reception function of the device under test 1, data storage processing for the reception data memory 23 is not executed.

To test the transmission function of the device under test 1, the transmission/reception unit 21 selectively receives a wireless frequency signal output from the device under test 1, performs quadrature demodulation to convert the signal into I and Q baseband quadrature data, and stores them as analysis target data in the reception data memory 23.

Based on measurement parameters designated through an operation unit 60 (to be described later) or the sequence measurement control means or part 35, a transmission/reception control unit 25 directly controls the transmission/reception frequency, the transmission level, the bandwidth, and the like of the transmission/reception unit 21, and controls read and write operations for each of the memories 22 and 23.

The hardware configuration of the system is not particularly limited. In this example, wideband high-speed dedicated hardware is used for the above-described transmission/reception unit 21, transmission data memory 22, reception data memory 23, and transmission/reception control unit 25. As for other components, the system mainly includes a CPU, RAM, and ROM, and also includes a software processing unit 20*a* which executes various processes according to programs stored in the memory, the operation unit 60 including a number of keys, a touch panel, and a pointing device, and a display unit 61 (a configuration which uses a general-purpose personal computer and an interface for remote control is included).

When testing the reception function (mainly, error measurement) of the device under test 1, the analysis means 26 receives the demodulated data of the device under test 1 for the digital modulated wave transmitted from the transmission/reception unit 21, and executes analysis processing such as error measurement, as described above. Note that only for error measurement, an error rate is obtained by comparing the demodulated data with the data stored in the transmission data memory 22. When testing the transmission function of the device under test 1, the analysis means 26 executes, for the analysis target data stored in the reception data memory 23, analysis processing for each designated measurement item, obtains a final test result, and then causes the display unit 61 to display the test result (a measurement value and OK/NG determination result).

A sequence list storage means 30 stores, as a measurement sequence, information containing a plurality of measurement items (including measurement parameters) to be simultaneously executed for the device under test 1, and an execution order of the items.

Figure 2:
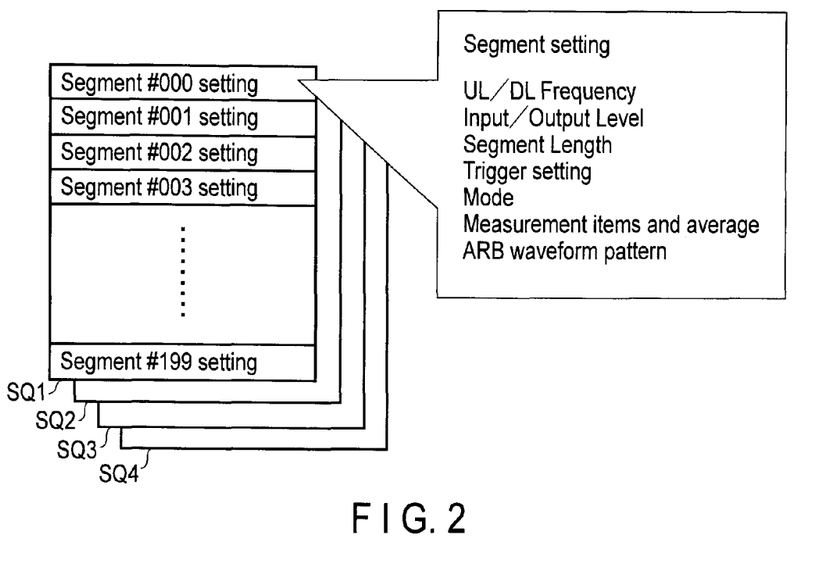
FIG. 2 is a view for explaining an example of a sequence list for a sequence function implemented in the mobile communication apparatus test system shown in FIG. 1.

FIG. 2 shows an example, in which a plurality (four in this example) of measurement sequences SQ1 to SQ4 which can be individually designated to execute are defined, and a predetermined number (200 in this example) of segments can be set as a rough measurement unit for each measurement sequence (segment numbers 000 to 199). Each segment is obtained by grouping measurement operations for which each parameter can be commonly described, and can be arbitrarily set by the user.

In each segment, parameters such as a transmission/reception frequency (UL/DL Frequency), transmission/reception level (Input/Output Level), segment length (Segment Length), trigger setting (Trigger Setting), mode (Mode), average number (Measurement item and average), and transmission pattern (ARB waveform pattern) are described. A GPIB command defined for remote control of a measurement unit can be used as a description format.

One of the measurement sequences, which has been arbitrarily designated by the user is executed. As described above, however, if an execution start segment number and execution end segment number are also designated for the one designated measurement sequence, it is possible to execute only the designated range of the sequence.

A sequence list creation means 31 is used by the user to register an arbitrary measurement sequence in the sequence list storage means or part 30. If, for example, the format of the measurement sequence is text data, the sequence list creation means 31 can be implemented as a text editor having functions of inputting and editing text. Note that it is possible to implement the sequence list creation means 31 using, for example, the text edit function of a personal computer (PC).

An execution sequence designation means or part 32 causes the sequence measurement control means or part 35 to designate and execute one of the measurement sequences stored in the sequence list storage means 30 by operating the operation unit 60. When designating a measurement sequence, it is possible to designate and execute an arbitrary range of the measurement sequence by inputting a start segment number and end segment number for the designated measurement sequence.

When the execution sequence designation means 32 designates to execute a measurement sequence, the sequence measurement control means 35 requests calculation and determination of a data amount for the designated measurement sequence, and determination of setting parameters of a data amount calculation means or part 40, data amount determination means or part 41, and parameter determination means or part 42. If the data amount determination means 41 and parameter determination means 42 determine that the measurement sequence is executable, the means 35 reads out information (information for each segment in the above example) of the designated measurement sequence in an execution order, and provides parameters contained in the readout information to the transmission/reception control unit 25 and device under test 1. Then, the means 35 stores data necessary for analysis and evaluation of the transmission function of the device under test 1 in the reception data memory 23 while controlling the device under test 1 and transmission/reception unit 21 according to the measurement sequence designated to execute.

If, for example, the measurement items of the measurement sequence include the transmission power and spectrum analysis of the transmission wave of the device under test 1, the sequence measurement control means 35 sets, to a test mode, the operation mode of the device under test 1 connected by a cable via an interface (not shown), and then designates parameters such as transmission (on), a transmission frequency (Ft), and a transmission level (La) according to the information of the measurement sequence designated to execute, thereby transmitting a signal with the frequency Ft and the level La. In synchronism with the transmission operation, the means 35 changes the reception frequency of the transmission/reception unit 21 within the range of Ft±ΔF (a range determined according to the communication standard) at a regular interval, and stores data indicating the spectrum characteristics of the transmission wave of the device under test 1 in the reception data memory 23. In this case, based on spectrum data stored in the reception data memory 23, the analysis means or part 26 executes analysis processing for measurement items (spurious energy, an adjacent channel interference ratio, and the like) associated with the spectrum and the transmission level of the device under test 1, and obtains a final test result such as a transmission power value, a spurious value, and an adjacent channel interference ratio, thereby causing, for example, the display unit 61 to display it.

Upon receiving, from the data amount determination means 41 or parameter determination means 42, a notification that the measurement sequence is not executable, the sequence measurement control means 35 rejects execution of the designated measurement sequence, and displays it on the display unit 61 to notify the user of it.

Upon receiving a request to calculate a data amount from the sequence measurement control means 35, the data amount calculation means 40 reads out the measurement sequence designated to execute from the sequence list storage means 30. Then, based on parameters described in each segment of the measurement sequence, the data amount calculation means 40 calculates a data amount, for each segment, to be acquired by the transmission/reception unit 21 in the measurement sequence, and a total value Dmax of the data amounts, and outputs them to the data amount determination means 41.

Examples of the capacity of the reception data memory 23 and the numerical value of a data amount acquired in the measurement sequence will be described. Assume that the capacity M of the reception data memory 23 is 4×256 Mbytes, and I and Q data each including 16 bits correspond to an amount for one sample (4 bytes). In this case, although the reception data memory 23 can store (capture) up to 256 Msamples, a maximum value for 233331000 samples, for example, is set as a permissible value M' close to the number of samples.

The smallest measurement unit is one step, and the number of samples per step depends on a mode such as a communication standard.

Since, for example, the sampling rate in W-CDMA is 50 MS/S, and the smallest measurement unit (smallest communication unit) is one slot (666.667 μS), the number of samples per step is given by:

$$50 \times (10^{\wedge}6) \times 666.667 \times (10^{\wedge}(-6)) = 33333$$

When acquiring data from the reception data memory 23 for measurement in W-CDMA, therefore, data for up to 7000 slots (=233331000/33333) can be acquired, which corresponds to 466 frames (about 5 seconds).

Figure 3:
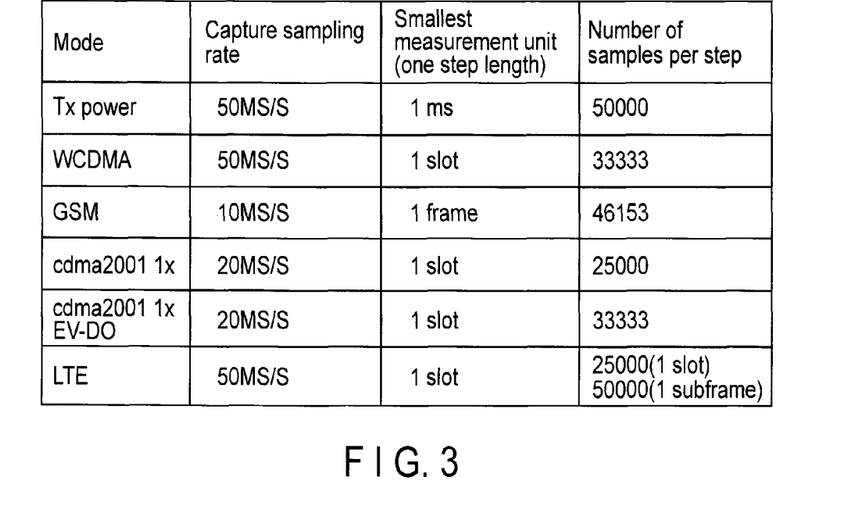
FIG. 3 is a table showing the relationship between a measurement mode and the number of samples per step in the mobile communication apparatus test system shown in FIG. 1.
Figure 4:
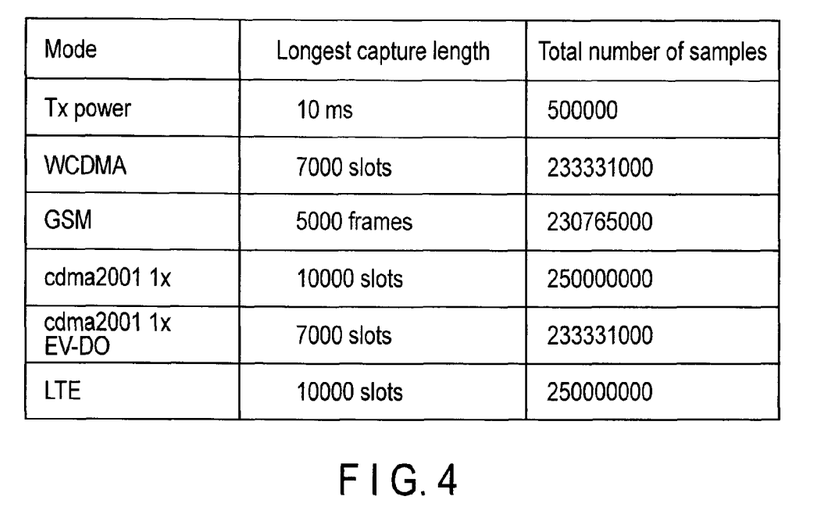
FIG. 4 is a table showing the relationship between a measurement mode and a longest measurement sequence length in the mobile communication apparatus test system shown in FIG. 1.

FIG. 3 shows an example of the number of samples per step for each mode including W-CDMA described above, and other communication standards such as GSM and CDMA2000. FIG. 4 shows the longest sequence length (longest capture length), for each mode, which can be stored in the memory.

Note that the permissible value M' may be set for each measurement item or communication standard with which a measurement target complies, or may be a constant value. FIG. 4 shows a case in which the permissible value M' is set differently for each item, and the longest capture length is accordingly determined.

As shown in FIGS. 3 and 4, a data amount D(1), . . . , or D(200) per segment is obtained by multiplying the number of samples per measurement unit, which is determined by the product of the sampling rate of each mode and a time (slot or frame) corresponding to the smallest measurement unit, by a measurement unit count required for measurement of the segment. Then, the sum of the data amounts is calculated, thereby obtaining the total value of a data amount to be acquired in the measurement sequence.

That is, for each of a number u (200 in the above example) of measurement segments, a number Si of samples per measurement unit, and a unit count Ki required for the measurement are obtained to calculate the total value Dmax according to:

$$D\mathrm{max} = \Sigma Di = \Sigma(Si \times Ki)$$

(where a symbol Σ represents a sum for i=1 to u)

Note that in this example, the data amounts D(1) to D(200) for the respective segments as well as the total value Dmax are output to the data amount determination means 41.

Upon receiving a determination request from the sequence measurement control means 35, the data amount determination means 41 compares the total value Dmax of the data amount with the permissible value M'(=M−α) (α represents a margin which is a positive value much smaller than M) set in advance for the capacity M of the reception data memory 23, thereby determining whether the measurement sequence designated to execute is executable. Then, the data amount determination means 41 notifies the sequence measurement control means 35 of the determination result.

In addition to information indicating whether the measurement sequence is executable, such as OK/NG or UNDER/OVER, the data amount determination means 41 notifies the sequence measurement control means 35 of a ratio of an amount to be used to the permissible value M'. Furthermore, if the measurement sequence is inexecutable, the data amount determination means 41 obtains the accumulated number of segments just before exceeding the permissible value M', which is obtained by accumulating data amounts from the start segment of the designated measurement sequence in an execution order, that is, an executable range, and notifies the sequence measurement control means 35 of it.

Upon receiving a determination request from the sequence measurement control means 35, the parameter determination means 42 determines whether each measurement parameter (a frequency, a level, or the like) described in each segment of the measurement sequence designated to execute falls within a range (stored in a parameter table (not shown) in advance) settable for the apparatus. If there is a parameter which falls outside the settable range, the parameter determination means 42 notifies the sequence measurement control means 35 of information such as the segment number and the type of parameter together with the determination result.

Upon receiving the determination result indicating that the measurement sequence is inexecutable from the data amount determination means 41, or the determination result indicating that there is a parameter exceeding the settable range from the parameter determination means 42, the sequence measurement control means 35 displays it on the display unit 61, and restricts (rejects) execution of the measurement sequence.

Figure 5:
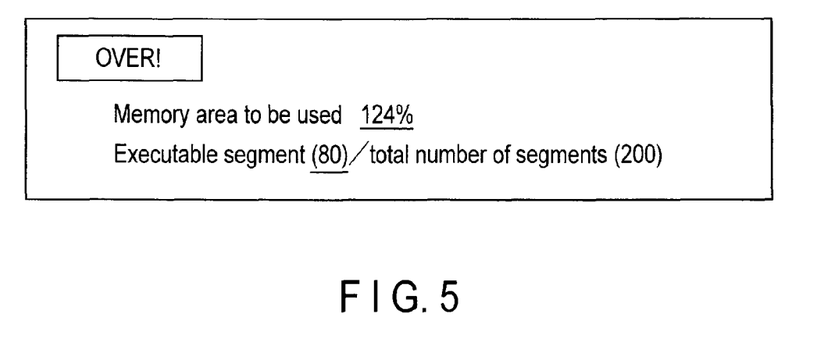
FIG. 5 is a view showing a display example of a data amount determination result in the mobile communication apparatus test system shown in FIG. 1.

The display format is arbitrary. As for the data amount determination result, however, characters "OVER", the memory usage ratio (124% in this example), and the executable range (a segment number 80 in this example) are displayed as shown in FIG. 5 so that the user can readily visually perceive the determination result, thereby displaying information indicating that the data amount to be acquired in the measurement sequence designated by the user to execute exceeds the permissible value and that the sequence up to the segment number 80 is executable. On the other hand, as for the parameter determination result, for example, the number of a segment including the parameter exceeding the settable range and the type of parameter are displayed in a list form.

As described above, the mobile communication apparatus test system 20 of the embodiment calculates the total value of the data amount to be acquired in the measurement sequence to be executed by the user, determines whether the total value exceeds the permissible value M' corresponding to the capacity of the reception data memory 23, and displays the determination result to notify the user of it. At the same time, if the total value exceeds the permissible value M', the system 20 restricts execution of the measurement sequence designated to execute.

Even if, for the measurement sequence to be executed, the user sets excessive measurement items, and sets inappropriate values as a measurement time, a bandwidth, a frequency resolution, and the like, and the total value of the data amount to be acquired in the measurement sequence exceeds the permissible value, the measurement sequence is not executed and the determination result is sent, thereby preventing incorrect and unnecessary measurement.

Note that as the determination result of the data amount determination means 41, characters such as "OVER" are displayed, and the ratio of the data amount to the permissible value, and the executable range are displayed using numerical values but they may be displayed using graphs.

The system of the embodiment has a function of notifying the user of the executable range in addition to the information indicating whether the measurement is executable. The system, therefore, can reliably execute a designated range of the measurement sequence by changing the end segment to the last executable segment N (N=80 in the above example) to redo execution designation. After the measurement sequence up to the last segment N ends, the system changes the start segment to a segment (N+1) to redo execution designation, thereby enabling to execute the remaining measurement sequence. Thus, the system can readily complete, without repetition or omission, the measurement sequence which the user wants to execute.

If the user is prompted to designate whether to execute the executable range of the measurement sequence, and operates to designate execution on the determination result display screen, the system may immediately execute the executable range of the measurement sequence from the start segment.

Furthermore, by dividing the measurement sequence designated to execute into a plurality of sequence blocks each of which provides a data amount not exceeding the permissible value, and notifying the user of information for specifying the range of each sequence block, it is possible to readily complete, without repetition or omission, the measurement sequence which the user wants to execute.

Figure 6:
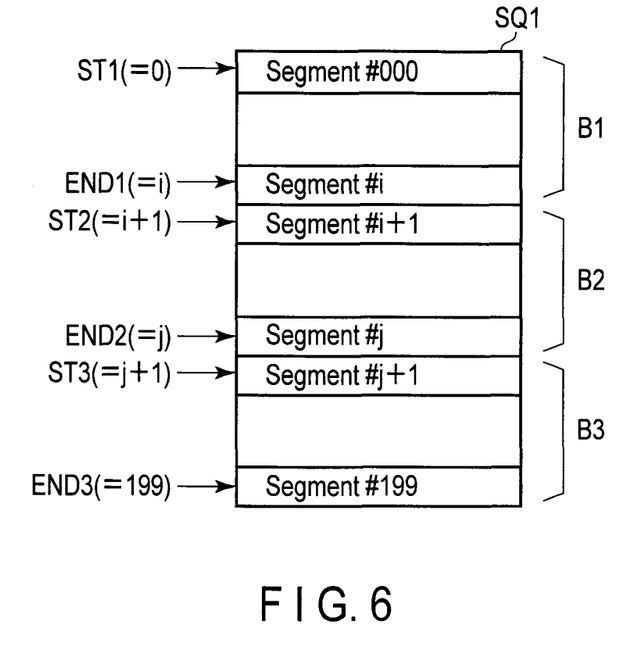
FIG. 6 is a view for explaining a status in which a measurement sequence designated to execute is divided into a plurality of executable blocks in the mobile communication apparatus test system shown in FIG. 1.

As shown in FIG. 6, for example, if the data amount determination means 41 determines that the total value of a data amount to be obtained in the measurement sequence SQ1 designated first to execute exceeds the permissible value M', the measurement sequence SQ1 is divided into a plurality (three in this example) of sequence blocks B1, B2, and B3 for which the total value of a data amount to be obtained in each sequence block does not exceed the permissible value M', and the sequence measurement control means 35 is notified of information of start segment numbers ST1 to ST3 and end segments END1 to END3 as information for specifying the ranges of the respective sequence blocks.

Upon receiving the information of the start segment numbers ST1 to ST3 and end segments END1 to END 3 for specifying the ranges of the plurality of sequence blocks, the sequence measurement control means 35 displays, on the display unit 61, the data amount determination result including the received information, thereby prompting the user to designate whether to execute the divided sequence blocks.

If the user operates the operation unit 60 to select execution, the sequence measurement control means 35 executes the sequence block B1 within the range from ST1 to END1. When the analysis means 26 completes analysis processing for data acquired in the executed sequence, the sequence block B2 within the range from ST2 to END2 is executed. Such processing is repeated to complete all the sequence blocks.

Assume that the test system automatically divides a measurement sequence into a plurality of sequence blocks, as described above. In this case, when the user is notified that the measurement sequence designated to execute cannot be sequentially executed, and designates, in response to this, to divide and execute the measurement sequence, the above series of processes is executed. With this processing, the measurement sequence is executed after the user recognizes that there was a problem with the first designation. It is, therefore, possible to avoid the risk of evaluating a measurement result without having an awareness of the problem.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for testing a mobile communication device under test comprising:

a transmission/reception unit configured to transmit a transmission signal to the device under test, and receive a target data signal from the device under test in response to the transmission signal;

a reception data memory having a predetermined capacity, and configured to store analysis target data which has been obtained from the target data signal when the transmission/reception unit receives the transmission signal of the device under test;

a transmission/reception control unit configured to control transmission/reception for the transmission/reception unit and the reception data memory according to a designated parameter;

an analysis module configured to read out data stored in the reception data memory to execute a designated analysis processing for the data;

a sequence list storage module configured to store, as a measurement sequence, information containing a plurality of measurement operations to be sequentially executed for the device under test, and an execution order of the measurement operations;

an execution sequence designation module configured to designate a sequence, which a user wants to execute, of the measurement sequences stored in the sequence list storage module;

a sequence measurement control module configured to sequentially execute parameter setting processing for the device under test and the transmission/reception control unit according to the measurement sequence designated by the execution sequence designation module, and store, in the reception data memory, data acquired by the transmission/reception unit from a start to an end of the measurement sequence; and a display unit;
the system further comprising:
a data amount calculation module configured to calculate, before the sequence measurement control module starts processing according to the designated measurement sequence, a total value of a data amount to be acquired as an analysis target by the transmission/reception unit in the designated measurement sequence; and
a data amount determination module configured to determine whether the calculated total value of the data amount exceeds a permissible value which has been set in advance according to the predetermined capacity of the reception data memory;
wherein if the data amount determination module determines that the calculated total value of the data amount exceeds the permissible value, the sequence measurement control module displays a determination result on the display unit.

2. The system according to claim 1, wherein the device under test includes a mobile terminal, a base station, or a communication circuit component used for the mobile terminal or the base station.

3. The system according to claim 1, wherein the data amount calculation module obtains, for each of the plurality of measurement operations, a data amount for the measurement operation by calculating a product of a data amount per predetermined measurement unit and a measurement unit count required for the measurement operation, and calculates the total value by obtaining a sum of the data amounts.

4. The system according to claim 3, wherein the measurement unit is one frame or one slot according to a communication standard with which the device under test complies.

5. The system according to claim 1, wherein
if it is determined that the total value of the data amount exceeds the permissible value, the data amount determination module checks an executable range of the measurement sequence designated to execute, within which a data amount from a start does not exceed the permissible value, and notifies the sequence measurement control module of the executable range, and
the sequence measurement control module displays, on the display unit, the determination result including the executable range.

6. The system according to claim 1, wherein
if it is determined that the total value of the data amount exceeds the permissible value, the data amount determination module divides the measurement sequence designated to execute into a plurality of executable blocks each of which has a data amount not exceeding the permissible value, and notifies the sequence measurement control module of information for specifying ranges of the respective executable blocks, and
the sequence measurement control module displays, on the display unit, the determination result including the information for specifying the ranges of the plurality of executable blocks.

7. A method of testing a mobile communication device under test, comprising steps of:
storing, as a measurement sequence, information containing a plurality of measurement operations to be sequentially executed for the device under test, and an execution order of the measurement operations,
designating a sequence, which a user wants to execute, of the stored measurement sequence,
sequentially executing parameter setting processing necessary for transmitting a transmission signal to the device under test and receiving a target data signal from the device under test according to the designated measurement sequence, and storing, in a reception data memory having a predetermined capacity, analysis target data received from a start to an end of the measurement sequence, and
reading out data stored in the reception data memory and executing designated analysis processing, the method comprising the steps of:
calculating, before the designated measurement sequence is executed, a total value of a data amount to be acquired as an analysis target data in the designated measurement sequence;
determining whether the calculated total value of the data amount exceeds a permissible value which has been set in advance according to the predetermined capacity of the reception data memory; and
displaying a determination result.

8. The method according to claim 7, wherein the device under test includes a mobile terminal, a base station, or a communication circuit component used for the mobile terminal or the base station.

9. The method according to claim 7, wherein
the step of calculating the total value of the data amount comprises the steps of
obtaining, for each of the plurality of measurement operations, a data amount for the measurement operation by calculating a product of a data amount per predetermined measurement unit and a measurement unit count required for the measurement operation, and
calculating the total value by obtaining a sum of the data amounts.

10. The method according to claim 9, wherein the measurement unit is one frame or one slot according to a communication standard with which the device under test complies.

11. The method according to claim 7, further comprising the steps of
checking, if it is determined that the total value of the data amount exceeds the permissible value, an executable range of the measurement sequence designated to execute, within which a data amount from a start does not exceed the permissible value, and
displaying the determination result including the executable range.

12. The method according to claim 7, further comprising the steps of
dividing, if it is determined that the total value of the data amount exceeds the permissible value, the measurement sequence designated to execute into a plurality of executable blocks each of which provides a data amount not exceeding the permissible value, and
displaying the determination result including information for specifying ranges of the plurality of executable blocks.

* * * * *